US012445799B2

(12) United States Patent
Devantier et al.

(10) Patent No.: US 12,445,799 B2
(45) Date of Patent: Oct. 14, 2025

(54) SURROUND SOUND TO IMMERSIVE AUDIO UPMIXING BASED ON VIDEO SCENE ANALYSIS

(71) Applicant: SAMSUNG ELECTRONICS CO., LTD., Suwon-si (KR)

(72) Inventors: Allan Devantier, Newhall, CA (US); Sunil Bharitkar, Stevenson Ranch, CA (US); Seongnam Oh, Irvine, CA (US); Carlos Tejeda Ocampo, Tuxtla Gutiérrez (MX)

(73) Assignee: Samsung Electronics Co., Ltd., Suwon-si (KR)

( * ) Notice: Subject to any disclaimer, the term of this patent is extended or adjusted under 35 U.S.C. 154(b) by 110 days.

(21) Appl. No.: 18/476,172

(22) Filed: Sep. 27, 2023

(65) Prior Publication Data

US 2024/0196158 A1 Jun. 13, 2024

Related U.S. Application Data

(60) Provisional application No. 63/431,263, filed on Dec. 8, 2022.

(51) Int. Cl.
*H04S 7/00* (2006.01)
*G06V 20/40* (2022.01)

(52) U.S. Cl.
CPC .............. *H04S 7/305* (2013.01); *G06V 20/49* (2022.01)

(58) Field of Classification Search
CPC .. H04S 2400/11; H04S 2400/15; H04S 3/008; H04S 2420/01; H04S 5/005; G10L 19/008; G06F 3/165
See application file for complete search history.

(56) References Cited

U.S. PATENT DOCUMENTS 10,073,607 B2 9/2018 Kim et al.
10,200,804 B2 2/2019 Chen et al.
(Continued)

FOREIGN PATENT DOCUMENTS

KR 10-2057393 B1 12/2019
WO 2018/162803 A1 9/2018

OTHER PUBLICATIONS

Avendano, C. et al., "A Frequency-Domain Approach to Multichannel Upmix," J. Audio Eng. Society, Jul. 2004, pp. 740-749, v. 52, No. 7/8, United States.

(Continued)

*Primary Examiner* — Kile O Blair
(74) *Attorney, Agent, or Firm* — Sherman IP LLP; Kenneth L. Sherman; Hemavathy Perumal

(57) ABSTRACT

One embodiment provides a method of audio upmixing comprising performing video scene analysis by segmenting visual objects from video frames of a video, and performing audio analysis by extracting audio signals from an audio corresponding to the video. The method further comprises determining whether any of the audio signals correspond to any of the visual objects, and estimating a video-based trajectory of a visual object if the visual object is in motion and transitions from on-screen to off-screen, or vice versa, during the video. The method further comprises positioning an audio trajectory of an audio signal from at least one speaker associated with the display to at least one other speaker associated with providing surround sound. The audio trajectory is automatically matched with the video. The audio signal is delivered to the at least one speaker and the at least one other speaker for audio reproduction during the presentation.

20 Claims, 9 Drawing Sheets

(56) References Cited

U.S. PATENT DOCUMENTS

| | | | |
|---|---|---|---|
| 10,477,311 | B2 | 11/2019 | Vilkamo |
| 11,026,037 | B2 | 6/2021 | Sridharan et al. |
| 11,089,423 | B2 | 8/2021 | Kim et al. |
| 2014/0119581 | A1 | 5/2014 | Tsingos et al. |
| 2016/0225377 | A1 | 8/2016 | Miyasaka et al. |
| 2017/0013202 | A1 | 1/2017 | Xu et al. |
| 2017/0013387 | A1 | 1/2017 | Fersch et al. |
| 2020/0368616 | A1 | 11/2020 | Delamont |

OTHER PUBLICATIONS

Nikunen, J., et al., "Multichannel Audio Upmixing by time-frequency filtering using non-negative tensor factorization," J. Audio Eng. Society, Oct. 2012, pp. 794-806, v. 60, n. 10, United States.

International Search Report and Written Opinion dated Feb. 2, 2024 for International Application PCT/KR2023/015705, from Korean Intellectual Property Office, pp. 1-11, Republic of Korea.

100

450

SURROUND SOUND TO IMMERSIVE AUDIO UPMIXING BASED ON VIDEO SCENE ANALYSIS

CROSS-REFERENCE TO RELATED APPLICATIONS

This application claims the priority benefit of U.S. Provisional Patent Application Ser. No. 63/431,263, filed on Dec. 8, 2022, which is incorporated herein by reference in its entirety.

TECHNICAL FIELD

One or more embodiments generally relate to loudspeaker systems, in particular, a method and system of surround sound to immersive audio upmixing based on video scene analysis.

BACKGROUND

Audio upmixing is a process of generating additional loudspeaker signals from source material with fewer channels than available speakers. For example, audio upmixing may involve converting 2-channel (i.e., stereo format) audio into multi-channel surround sound audio (e.g., 5.1 surround sound, 7.1 surround sound, or 7.1.4 immersive audio).

SUMMARY

One embodiment provides a method of audio upmixing. The method comprises performing video scene analysis by segmenting one or more visual objects from one or more video frames of a video, and performing audio analysis by extracting one or more audio signals from an audio corresponding to the video. The method further comprises determining whether any of the audio signals correspond to any of the visual objects. The method further comprises estimating a video-based trajectory of a visual object of the visual objects if the visual object is in motion and transitions from on-screen to off-screen, or vice versa, during the video. The method further comprises positioning an audio trajectory of an audio signal of the audio signals from at least one speaker associated with the display to at least one other speaker associated with providing surround sound. The audio trajectory is automatically matched with the video. The audio signal is delivered to the at least one speaker and the at least one other speaker for audio reproduction during the presentation.

Another embodiment provides a system of audio upmixing comprising at least one processor and a non-transitory processor-readable memory device storing instructions that when executed by the at least one processor causes the at least one processor to perform operations. The operations include performing video scene analysis by segmenting one or more visual objects from one or more video frames of a video, and performing audio analysis by extracting one or more audio signals from an audio corresponding to the video. The operations further include determining whether any of the audio signals correspond to any of the visual objects. The operations further include estimating a video-based trajectory of a visual object of the visual objects if the visual object is in motion and transitions from on-screen to off-screen, or vice versa, during the video. The operations further include positioning an audio trajectory of an audio signal of the audio signals from at least one speaker associated with the display to at least one other speaker associated with providing surround sound. The audio trajectory is automatically matched with the video. The audio signal is delivered to the at least one speaker and the at least one other speaker for audio reproduction during the presentation.

A non-transitory processor-readable medium that includes a program that when executed by a processor performs a method of audio upmixing. The method comprises performing video scene analysis by segmenting one or more visual objects from one or more video frames of a video, and performing audio analysis by extracting one or more audio signals from an audio corresponding to the video. The method further comprises determining whether any of the audio signals correspond to any of the visual objects. The method further comprises estimating a video-based trajectory of a visual object of the visual objects if the visual object is in motion and transitions from on-screen to off-screen, or vice versa, during the video. The method further comprises positioning an audio trajectory of an audio signal of the audio signals from at least one speaker associated with the display to at least one other speaker associated with providing surround sound. The audio trajectory is automatically matched with the video. The audio signal is delivered to the at least one speaker and the at least one other speaker for audio reproduction during the presentation.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

Figure 1:
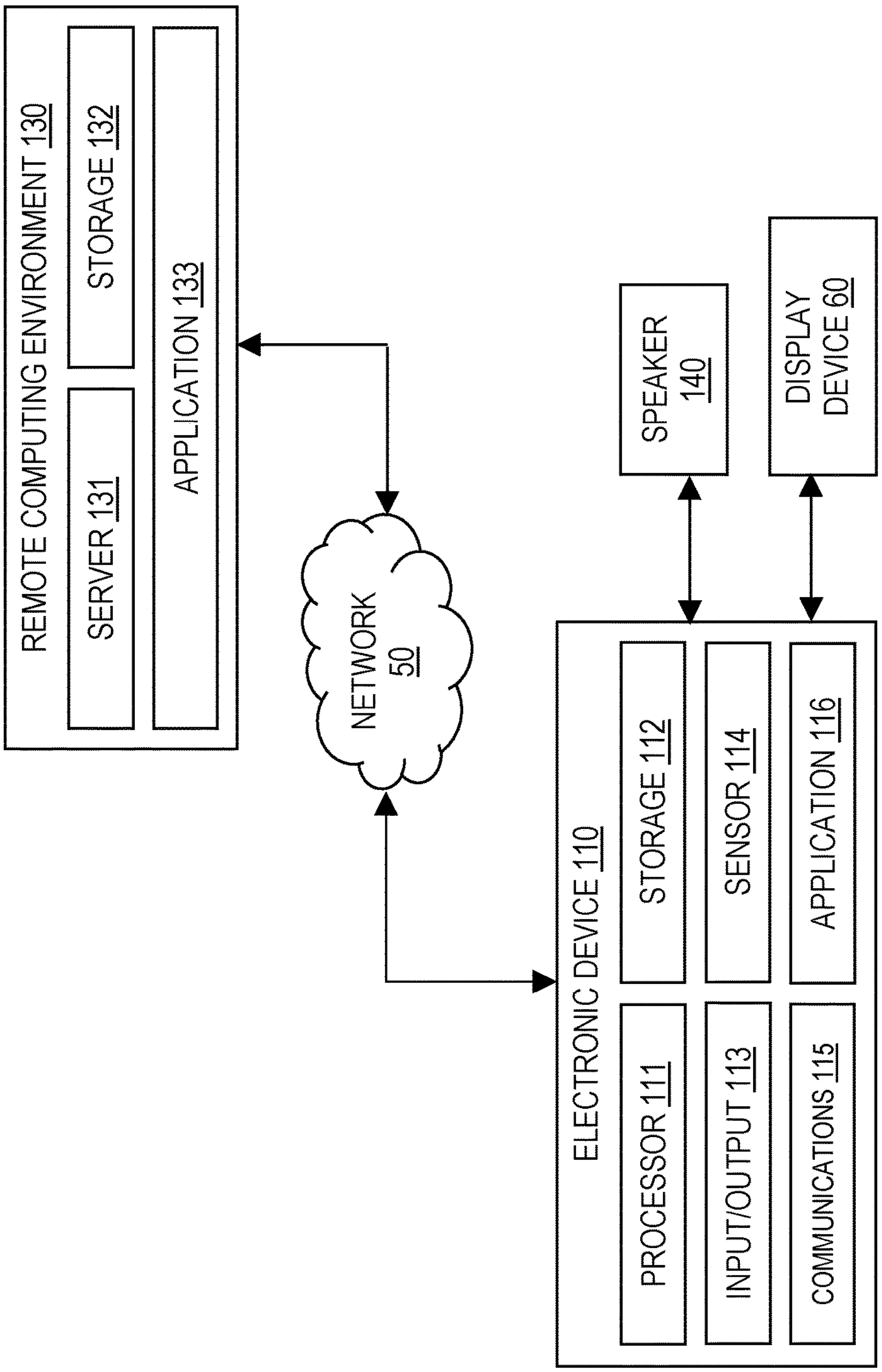
FIG. 1 is an example computing architecture for implementing surround sound to immersive audio upmixing based on video scene analysis, in one or more embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments generally relate to loudspeaker systems, in particular, a method and system of surround sound to immersive audio upmixing based on video scene analysis. One embodiment provides a method of audio upmixing. The method comprises performing video scene analysis segmenting one or more visual objects from one or more video frames of a video, and performing audio analysis by extracting one or more audio signals from an audio corresponding to the video. The method further comprises determining whether any of the audio signals correspond to any of the visual objects. The method further comprises estimating a video-based trajectory of a visual object of the visual objects if the visual object is in motion and transitions from on-screen to off-screen, or vice versa, during the video. The method further comprises positioning an audio trajectory of an audio signal of the audio signals from at least one speaker associated with the display to at least one other speaker associated with providing surround sound. The audio trajectory is automatically matched with the video. The audio signal is delivered to the at least one speaker and the at least one other speaker for audio reproduction during the presentation.

Another embodiment provides a system of audio upmixing comprising at least one processor and a non-transitory processor-readable memory device storing instructions that when executed by the at least one processor causes the at least one processor to perform operations. The operations include performing video scene analysis by segmenting one or more visual objects from one or more video frames of a video, and performing audio analysis by extracting one or more audio signals from an audio corresponding to the video. The operations further include determining whether any of the audio signals correspond to any of the visual objects. The operations further include estimating a video-based trajectory of a visual object of the visual objects if the visual object is in motion and transitions from on-screen to off-screen, or vice versa, during the video. The operations further include positioning an audio trajectory of an audio signal of the audio signals from at least one speaker associated with the display to at least one other speaker associated with providing surround sound. The audio trajectory is automatically matched with the video. The audio signal is delivered to the at least one speaker and the at least one other speaker for audio reproduction during the presentation.

A non-transitory processor-readable medium that includes a program that when executed by a processor performs a method of audio upmixing. The method comprises performing video scene analysis by segmenting one or more visual objects from one or more video frames of a video, and performing audio analysis by extracting one or more audio signals from an audio corresponding to the video. The method further comprises determining whether any of the audio signals correspond to any of the visual objects. The method further comprises estimating a video-based trajectory of a visual object of the visual objects if the visual object is in motion and transitions from on-screen to off-screen, or vice versa, during the video. The method further comprises positioning an audio trajectory of an audio signal of the audio signals from at least one speaker associated with the display to at least one other speaker associated with providing surround sound. The audio trajectory is automatically matched with the video. The audio signal is delivered to the at least one speaker and the at least one other speaker for audio reproduction during the presentation.

Conventional audio created for video (e.g., cinematic content, TV shows, etc.) is formatted as channel-based audio such as 2-channel audio (i.e., stereo format) or multi-channel surround sound audio (e.g., surround sound formats such as 5.1 surround sound, 7.1 surround sound, 7.1.4 immersive audio, etc.). The channel-based audio is created in a mix stage and post-produced by an audio mix engineer matching the audio to scenes of the video. For example, if a scene of the video captures a car moving from right to left, the audio mix engineer will pan the audio from a right speaker to a left speaker to match the motion of the car. However, content may be distributed in stereo and surround sound formats due to available bandwidth (i.e., data rate limits) for streaming, a loudspeaker setup (i.e., speaker configuration) at a consumer end (e.g., at a client device), etc. For example, audio in a 7.1.4 immersive audio format can be downmixed to 5.1 surround sound format before the audio is transmitted for streaming, broadcasting, or storage on a server. As another example, audio in a 7.1.4 immersive audio format can be downmixed to a stereo format before the audio is transmitted for streaming, broadcasting, or storage on a server. As such, surround speaker channels or height speaker channels may be missing in audio received at a consumer end.

Conventional solutions for audio upmixing rely purely on audio analysis of audio signals. Typically, audio analysis of audio signals involves using either passive upmixing decoders or active upmixing in which the audio signals are analyzed in a time-frequency domain (i.e., determining directional and diffuse audio signals before the audio signals are steered to front speakers or surround/height speakers).

There are several problems that may arise with conventional solutions. For example, during content creation, audio is typically "matched" to video but none of these conventional solutions use this paradigm to upmix audio to the correct loudspeaker channels. As another example, an audio-based upmixer may pan audio/voice to a center loudspeaker channel (e.g., positioned next to a display device), but a scene captured in the video frame does not include a person speaking (e.g., the scene may involve an astronaut in the rear and outside the video frame with voice mixed to the back or sides). As yet another example, a resulting audio mix may not accurately match the artistic/creative intent of a creator (e.g., a director) or may reduce immersion and spatial experience of a listener. None of these conventional solutions rely on video information as a signal augmentation approach when performing audio processing.

One or more embodiments provide a framework for automatically creating audio signals for surround speakers or height speakers (or upward firing speakers) based on video scene analysis. A video (e.g., a synthetic video such as a video game and a CGI movie, or a real-video such as a movie, etc.) is provided to/received at a client device for presentation on a display integrated in or coupled to the client device. In one embodiment, the framework jointly performs audio analysis (i.e., audio scene analysis) and video scene analysis on the client device. The audio analysis involves extracting one or more audio signals from a complex audio mix (e.g., in stereo format or surround sound format) corresponding to the video using audio source separation techniques. The framework then positions the audio signals at one or more speakers (i.e., assigned to one or more speaker channels), or panned in between the speakers, based on the video scene analysis. Each audio signal is delivered to a speaker the audio signal is positioned at for reproduction.

In one embodiment, the framework estimates a video-based (i.e., visual) trajectory for a visual motion (i.e., moving visual object) during a display transition (e.g., transitioning from on-display/on-screen to off-display/off-screen, or transitioning from off-display/off-screen to on-display/on-screen) of the video. For example, if a scene of the video captures a fighter jet moving on-screen from right to left then moving off-screen, the framework extracts audio signals corresponding to the engine of the fighter jet from the complex audio mix, and pans the audio signals from one or more right surround speakers to one or more left surround speakers (as the fighter jet moves on-screen from right to left), and then extrapolates the audio signals to one or more other surround/height speakers (as the fighter jet moves off-screen).

In one embodiment, the framework pans and positions an audio trajectory—that is matched with the video—from one or more speakers of the display (e.g., TV speakers) to one or more surround speakers or height speakers (or upward firing speakers).

For expository purposes, the terms "audio signal" and "audio object" are used interchangeably in this specification.

In one embodiment, the framework extracts an audio object from the complex audio mix, wherein the audio object corresponds to either a visual object that is visually present (i.e., seen) in one or more video frames or a non-visual object that is not visually present (i.e., seen) in the one or more video frames (i.e., independent of or not present in the video). The framework classifies the audio object as directional or diffuse, and estimates a likelihood of the audio object being assigned to a horizontal speaker channel or a height speaker (or upward firing speaker) channel based on the classification. For example, in one embodiment, the framework is deployed as an audio upmixer configured to extract an individual audio object (or stem), classify/identify a type of the audio object (e.g., a voice, footsteps, an animal, ambience, a machine, a vehicle, etc.), determine if the audio object corresponds to the visual object in the video or not, and use video or audio scene analysis to reconstruct and upmix audio appropriately. The resulting audio mix better approximates artistic/creative intent compared to conventional solutions that rely only on audio processing for upmixing. Further, the audio upmixer is provided with upmix parameters that are adjusted based on the video scene analysis.

FIG. 1 is an example computing architecture 100 for implementing surround sound to immersive audio upmixing based on video scene analysis, in one or more embodiments. The computing architecture 100 comprises an electronic device 110 including computing resources, such as one or more processor units 111 and one or more storage units 112. One or more applications 116 may execute/operate on the electronic device 110 utilizing the computing resources of the electronic device 110.

In one embodiment, the electronic device 110 receives a video for presentation on a display device 60 integrated in or coupled to the electronic device 110. In one embodiment, the one or more applications 116 on the electronic device 110 include a system that facilitates surround sound to immersive audio upmixing based on video scene analysis of the video. As described in detail later herein, the system automatically creates audio signals for one or more speakers 140 (e.g., surround speakers or height speakers) based on the video scene analysis.

The one or more speakers 140 are integrated in or coupled to the electronic device 110 and/or the display device 60. The one or more speakers 140 have a corresponding loudspeaker setup (i.e., speaker configuration) (e.g., stereo, 5.1 surround sound, 7.1 surround sound, 7.1.4 immersive audio, etc.). Examples of a speaker 140 include, but are not limited to, a surround speaker, a height speaker, an upward driving speaker, an immersive speaker, a speaker of the display device 60 (e.g., a TV speaker), a soundbar, a pair of headphones or earbuds, etc.

The electronic device 110 represents a client device at a consumer end. Examples of an electronic device 110 include, but are not limited to, a media system including an audio system, a media playback device including an audio playback device, a television (e.g., a smart television), a mobile electronic device (e.g., an optimal frame rate tablet, a smart phone, a laptop, etc.), a wearable device (e.g., a smart watch, a smart band, a head-mounted display, smart glasses, etc.), a gaming console, a video camera, a media playback device (e.g., a DVD player), a set-top box, an Internet of Things (IOT) device, a cable box, a satellite receiver, etc.

In one embodiment, the electronic device 110 comprises one or more sensor units 114 integrated in or coupled to the electronic device 110, such as a camera, a microphone, a GPS, a motion sensor, etc.

In one embodiment, the electronic device 110 comprises one or more input/output (I/O) units 113 integrated in or coupled to the electronic device 110. In one embodiment, the one or more I/O units 113 include, but are not limited to, a physical user interface (PUI) and/or a graphical user interface (GUI), such as a keyboard, a keypad, a touch interface, a touch screen, a knob, a button, a display screen, etc. In one embodiment, a user can utilize at least one I/O unit 113 to configure one or more user preferences, configure one or more parameters, provide user input, etc.

In one embodiment, the one or more applications 116 on the electronic device 110 may further include one or more software mobile applications loaded onto or downloaded to the electronic device 110, such as an audio streaming application, a video streaming application, etc.

In one embodiment, the electronic device 110 comprises a communications unit 115 configured to exchange data with a remote computing environment, such as a remote computing environment 130 over a communications network/connection 50 (e.g., a wireless connection such as a Wi-Fi connection or a cellular data connection, a wired connection, or a combination of the two). The communications unit 115 may comprise any suitable communications circuitry operative to connect to a communications network and to exchange communications operations and media between the electronic device 110 and other devices connected to the same communications network 50. The communications unit 115 may be operative to interface with a communications network using any suitable communications protocol such as, for example, Wi-Fi (e.g., an IEEE 802.11 protocol), Bluetooth®, high frequency systems (e.g., 900 MHZ, 2.4 GHZ, and 5.6 GHz communication systems), infrared, GSM, GSM plus EDGE, CDMA, quadband, and other cellular protocols, VOIP, TCP-IP, or any other suitable protocol.

In one embodiment, the remote computing environment 130 includes computing resources, such as one or more servers 131 and one or more storage units 132. One or more applications 133 that provide higher-level services may execute/operate on the remote computing environment 130 utilizing the computing resources of the remote computing environment 130.

In one embodiment, the remote computing environment 130 provides an online platform for hosting one or more online services (e.g., an audio streaming service, a video streaming service, etc.) and/or distributing one or more applications. For example, an application 116 may be loaded onto or downloaded to the electronic device 110 from the remote computing environment 130 that maintains and distributes updates for the application 116. As another example, a remote computing environment 130 may comprise a cloud computing environment providing shared pools of configurable computing system resources and higher-level services.

Figure 2:
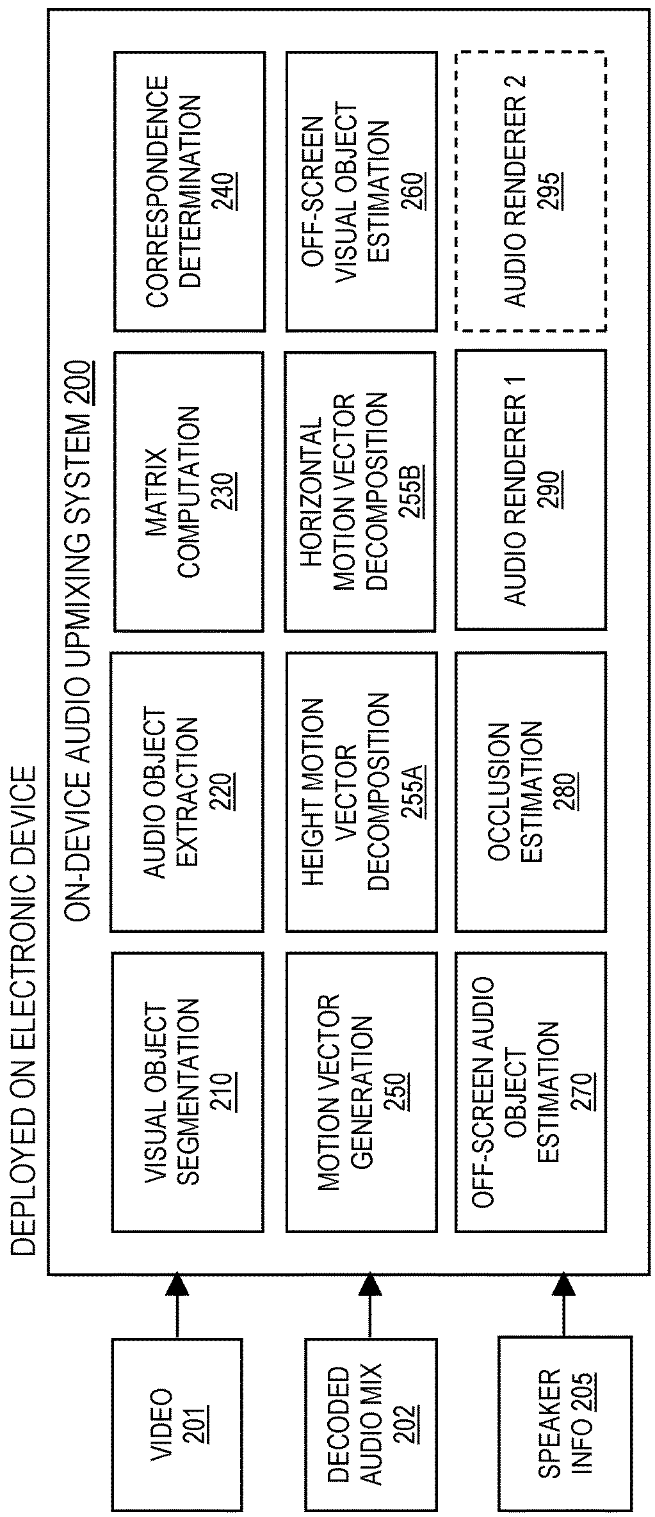
FIG. 2 illustrates an example on-device automatic audio upmixing system, in one or more embodiments.

FIG. 2 illustrates an example on-device automatic audio upmixing system 200, in one or more embodiments. In one embodiment, an application 116 (FIG. 1) executing/running on an electronic device 110 (FIG. 1) is implemented as the system 200. The system 200 implements on-device (i.e., on a client device) surround sound to immersive audio upmixing based on video scene analysis. The system 200 implements the audio upmixing in a blind post-processing based manner within a System-on-Chip (SoC) in real-time.

The system 200 is configured to receive at least the following inputs: (1) a video 201 comprising a plurality of video frames 203 (FIG. 3A), (2) a decoded audio mix 202 (i.e., a complex audio mix in stereo format or surround sound format) corresponding to the video 201, and (3) speaker information 205 relating to speakers (e.g., speakers 140 in FIG. 1) available for audio reproduction. The speaker information 205 includes information such as, but not limited to, loudspeaker setup (i.e., speaker configuration) of the speakers, type of the speakers (e.g., headphones, TV speakers, surround speakers, soundbar, etc.), positions of the speakers, model of the speakers, etc.

In one embodiment, the system 200 comprises a visual object segmentation unit 210 configured to segment one or more visual objects (i.e., video objects) from one or more video frames 203 (FIG. 3A) of the video 201.

Audio source separation is the process of separating an audio mix (e.g., a pop band recording) into isolated sounds from individual sources (e.g., lead vocals only). In one embodiment, the system 200 comprises an audio object extraction unit 220 configured to extract, using one or more audio source separation techniques, one or more audio objects (i.e., audio signals) from the decoded audio mix 202. In one embodiment, the audio object extraction unit 220 involves techniques such as blind source separation, independent component analysis (ICA), or machine-learning techniques to separate the individual audio signals (i.e., audio objects) from a complex mixture (i.e., complex audio mix).

In one embodiment, the system 200 comprises a matrix computation unit 230 configured to: (1) receive one or more visual objects segmented from the video 201 (e.g., from the visual object segmentation unit 210), (2) receive one or more audio objects extracted from the decoded audio mix 202 (e.g., from the audio object extraction unit 220), and (3) compute a matrix P of probabilities. Each probability of a matrix P corresponds to an object pair comprising a visual object segmented from the video 201 and an audio object extracted from the decoded audio mix 202, and represents a likelihood/probability of a match (i.e., correspondence) between the visual object and the audio object. For example, if a visual object is a fighter jet and an audio object comprises an audio signal corresponding to the engine of the fighter jet, there is a high likelihood/probability of a match between the visual object and the audio object. As another example, if a visual object is a baby and an audio object comprises an audio signal corresponding to the barking of a dog, there is a low likelihood/probability of a match between the visual object and the audio object. Accordingly, at least two conditions can be assigned where (i) there is one-to-one correspondence between a visually segmented scene (i.e., a visual scene) including one or more visual objects and extracted audio objects, and (ii) where there is no one-to one correspondence between at least one of the extracted audio objects and the visual objects in the visual scene.

An example matrix P of probabilities is expressed in accordance with equation (1) provided below:

$$P = \begin{pmatrix} 0.9 & 0.2 & \ldots & 0.2 \\ 0.3 & 0.1 & \ldots & 0.1 \\ \vdots & \vdots & \ddots & \vdots \\ 0.2 & 0.2 & \ldots & 0.2 \end{pmatrix}, \qquad (1)$$

wherein a number of columns of the matrix P is equal to a total number of visual objects segmented from a video 201, and a number of rows of the matrix P is equal to a total number of audio objects extracted from a decoded audio mix 202 corresponding to the video 201.

In one embodiment, the system 200 comprises a correspondence determination unit 240 configured to: (1) receive a matrix P of probabilities (e.g., from the computation unit 230), and (2) for each object pair corresponding to each probability of the matrix P, determine whether there is a match (i.e., correspondence) between a visual object of the object pair and an audio object of the same object pair.

In one embodiment, the system 200 comprises a motion vector generation unit 250 configured to generate a motion vector of a visual object segmented from the video 201. A motion vector of a visual object is indicative of at least one of the following: a position/location of the visual object, a video-based (i.e., visual) trajectory of the visual object, a velocity of the visual object, and an acceleration of the visual object. For example, a fast moving object (e.g., a fighter jet) has a high velocity, whereas a slow moving object (e.g., a trotting horse) has a low velocity.

In one embodiment, the system 200 comprises a height motion vector decomposition unit 255A configured to: (1) receive a motion vector of a visual object (e.g., from the motion vector generation unit 250), and (2) decompose the motion vector into a height motion vector of the visual object. The system 200 uses height motion vectors to guide how audio signals positioned to height speakers (or upward firing speakers) are rendered.

In one embodiment, the system 200 comprises a horizontal motion vector decomposition unit 255B configured to: (1) receive a motion vector of a visual object (e.g., from the motion vector generation unit 250), and (2) decompose the motion vector into a horizontal motion vector of the visual object. The system 200 uses horizontal motion vectors to guide how audio signals positioned to surround speakers are rendered.

In one embodiment, the system 200 comprises an off-screen visual object estimation unit 260 configured to estimate an off-screen position or trajectory of a visual object segmented from the video 201.

The system 200 estimates (via the motion vector generation unit 250 and the off-screen visual object estimation unit

260) a video-based trajectory of a visual object if the visual object is in motion and transitions from on-screen to off-screen, or vice versa, during the video.

In one embodiment, the system 200 comprises an off-screen audio object estimation unit 270 configured to estimate an off-screen position or trajectory of an audio object extracted from the decoded audio mix 202 by: (1) separating the audio object into one or more directional objects (i.e., direction audio signals) and one or more diffuse objects (i.e., diffuse audio signals), (2) classifying/identifying the one or more directional objects (e.g., car, helicopter, plane, instrument, etc.), (3) classifying/identifying the one or more diffuse objects (e.g., rain, lightning, wind, etc.), and (4) estimating either likelihoods/probabilities for off-screen audio trajectory between speakers or likelihoods/probabilities for off-screen positions of the one or more directional objects and the one or more diffuse objects. For example, the off-screen audio object estimation unit 270 estimates a likelihood/probability that the audio object is assigned to a horizontal speaker channel or a height speaker channel based on the classifying.

The system 200 pans and positions (via the off-screen audio object estimation unit 270) an audio trajectory of an audio signal from at least one speaker associated with a display device (e.g., display device 60 in FIG. 1) (e.g., TV speakers) to at least one other speaker associated with providing surround sound (e.g., surround speakers, height speakers, upward firing speakers, etc.).

In one embodiment, the system 200 comprises an occlusion estimation unit 280 configured to estimate occlusion for a visual object segmented from the video 201, i.e., the visual object is partially or totally occluded (i.e., blocked) by one or more other visual objects in the foreground of the video 201. Accordingly, the acoustics of the occluded visual object can be modified (e.g., diffraction, attenuation, etc.)

In one embodiment, the system 200 comprises a first audio renderer 290 corresponding to soundbar and surround/height speakers. The first audio renderer 290 is configured to: (1) receive speaker information 205 indicative of one or more positions of the soundbar and surround/height speakers, (2) receive a height motion vector of a visual object segmented from the video 201 (e.g., from the height motion vector decomposition unit 255A), (3) receive a horizontal motion vector of the visual object (e.g., from the horizontal motion vector decomposition unit 255B), (4) receive an audio object extracted from the decoded audio mix 202 (e.g., from the audio object extraction unit 220), (5) receive an estimated off-screen position or trajectory of the audio object (e.g., from the off-screen audio object estimation unit 270), and (6) based on the motion vectors, pan and project the audio object from the soundbar to the surround/height speakers (i.e., the audio object is assigned to one or more speaker channels using optimized re-substitution for audio panning). The resulting rendered audio object is matched to the video 201 and delivered to the soundbar and surround/height speakers for audio reproduction.

In one embodiment, the system 200 optionally comprises a second audio renderer 295 corresponding to TV/soundbar speakers. The second audio renderer 295 is configured to: (1) receive speaker information 205 indicative of one or more positions of the TV/soundbar speakers, (2) receive a height motion vector of a visual object segmented from the video 201 (e.g., from the height motion vector decomposition unit 255A), (3) receive a horizontal motion vector of the visual object (e.g., from the horizontal motion vector decomposition unit 255B), (4) receive an audio object extracted from the decoded audio mix 202 (e.g., from the audio object extraction unit 220), and (5) filter the audio object with crosstalk and spatial filters. The resulting rendered audio object is matched to the video 201 and delivered to the TV/soundbar speakers for audio reproduction.

In one embodiment, each audio renderer 290, 295 is configured to perform various automated mixing operations such as, but not limited to, the following: (1) unmixer (audio source separation) for audio objects with classifications based on visual objects with classifications, (2) panner (e.g., a Vector Base Amplitude Panning (VBAP) panner), (3) decorrelator (spread for size of audio object), and (4) snapper (snap to speaker). The system 200 is able to extrapolate audio signals corresponding to visual objects that move off-screen. For example, if video frames capture a moving drone, the system 200 is able to pan mono audio corresponding to the drone to surround/height speakers (e.g., 7.1.4 immersive audio) using a motion vector of the drone and VBAP.

One or more embodiments of the system 200 may be integrated into, or implemented as part of, a loudspeaker control system or a loudspeaker management system. One or more embodiments of the system 200 may be implemented in soundbars with satellite speakers (surround/height speakers). One or more embodiments of the system 200 may be implemented in TVs for use in combination with soundbars and surround/height speakers.

Figure 3A:
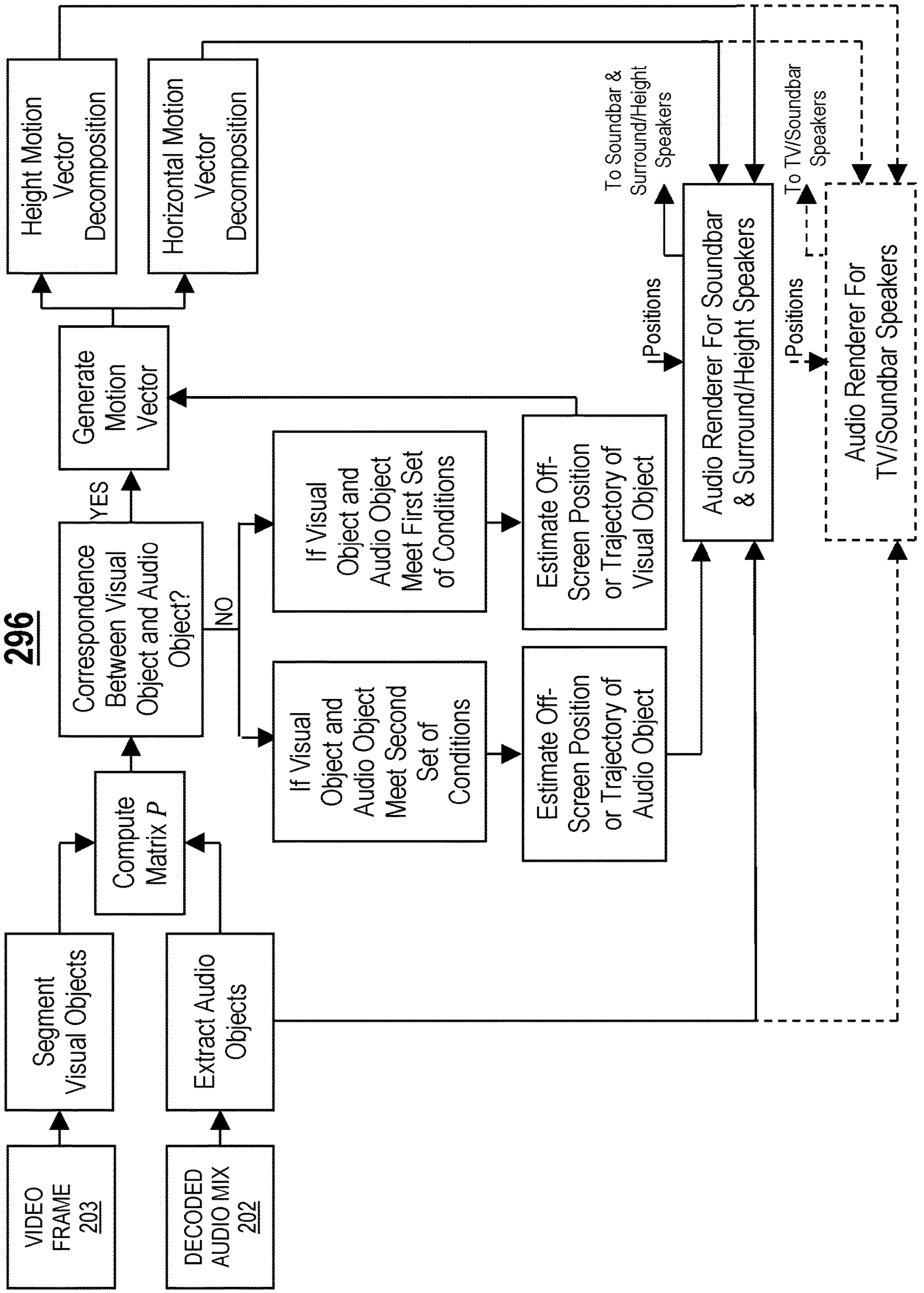
FIG. 3A illustrates an example workflow implemented by the on-device automatic audio upmixing system, in one or more embodiments.

FIG. 3A illustrates an example workflow 296 implemented by the on-device automatic audio upmixing system 200, in one or more embodiments. As part of the workflow 296, the system 200 jointly performs audio analysis (i.e., audio scene analysis) and video scene analysis on-device (i.e., on a client device, e.g., on an electronic device 110). Specifically, the system 200 segments (e.g., via the visual object segmentation unit 210) one or more visual objects from one or more video frames 203 of a video 201 (FIG. 2), and extracts (e.g., via the audio object extraction unit 220) one or more audio objects from a decoded audio mix 202 corresponding to the video 201.

The system 200 then computes (e.g., via the matrix computation unit 230) a matrix P of probabilities. For each object pair corresponding to each probability of the matrix P, the system 200 determines (e.g., via the correspondence determination unit 240) whether there is a match (i.e., correspondence) between a visual object of the object pair and an audio object of the same object pair in a current video frame.

If there is a match between the visual object and the audio object (i.e., both are in the current video frame), the system 200 generates (e.g., via the motion vector generation unit 250) a motion vector of the visual object, and decomposes (e.g., via the decomposition units 255A and 255B) the motion vector into a height motion vector of the visual object and a horizontal motion vector of the visual object.

If there is no match between a visual scene including one or more visual objects and at least one of the extracted audio objects (i.e., only the audio object is in the current video frame), the system 200 further determines (e.g., via the correspondence determination unit 240) whether the visual object and the audio object satisfy either a first set of conditions or a second set of conditions. If the first set of conditions is satisfied, the system 200 estimates (e.g., via the off-screen visual object estimation unit 260) an off-screen position or trajectory of the visual object, generates (e.g., via the motion vector generator unit 250) a motion vector of the visual object, and decomposes (e.g., via the decomposition units 255A and 255B) the motion vector into a height motion vector of the visual object and a horizontal motion vector of the visual object. If the second set of conditions is satisfied instead, the system 200 estimates (e.g., via the off-screen audio object estimation unit 270) an off-screen position or trajectory of the audio object.

In one embodiment, the visual object and the audio object satisfy the first set of conditions if the following conditions are true (i.e., met): (1) the visual object is not in the current video frame, but the audio object corresponding to the visual object is in the current video frame, and (2) the visual object is in N prior video frames preceding the current video frame, and the audio object is in M prior video frames preceding the current video frame. The first set of conditions represent the visual object moving from on-screen (i.e., both are in prior video frames) to off-screen (i.e., only the audio object is in the current video frame). Therefore, if the visual object is moving from on-screen to off-screen (e.g., a fighter jet moving on-screen from right to left then moving off-screen), the system 200 estimates (e.g., via the off-screen visual object estimation unit 260) an off-screen position or trajectory of the visual object.

In one embodiment, the visual object and the audio object satisfy the second set of conditions instead if the following conditions are true (i.e., met): (1) the visual object is not in the current video frame, but the audio object is in the current video frame, and (2) the visual object is not in N prior video frames preceding the current video frame, but the audio object is in M prior video frames preceding the current video frame. The second set of conditions represent that the audio object that does not have any correspondence with the visual object in prior video frames (i.e., only the audio object is in the prior video frames). Therefore, if an audio object does not have any correspondence with the visual object in prior video frames (e.g., hearing rain that cannot be seen on-screen, hearing footsteps of a person who cannot be seen on-screen), the system 200 estimates (e.g., via the off-screen audio object estimation unit 270) an off-screen position or trajectory of the audio object.

The system 200 renders (e.g., via the first audio renderer 290) the audio object for soundbar and surround/height speakers based on positions of the soundbar and surround/height speakers (e.g., from the speaker information 205), the height motion vector of the visual object, the horizontal motion vector of the visual object, and an estimated off-screen position or trajectory of the audio object. The resulting rendered audio object is matched to the video and delivered to the soundbar and surround/height speakers for audio reproduction.

Optionally, the system 200 renders (e.g., via the second audio renderer 295) the audio object for TV/soundbar speakers based on positions of the TV/soundbar speakers (e.g., from the speaker information 205), the height motion vector of the visual object, and the horizontal motion vector of the visual object. The resulting rendered audio object is matched to the video and delivered to the TV/soundbar speakers for audio reproduction.

Figure 3B:
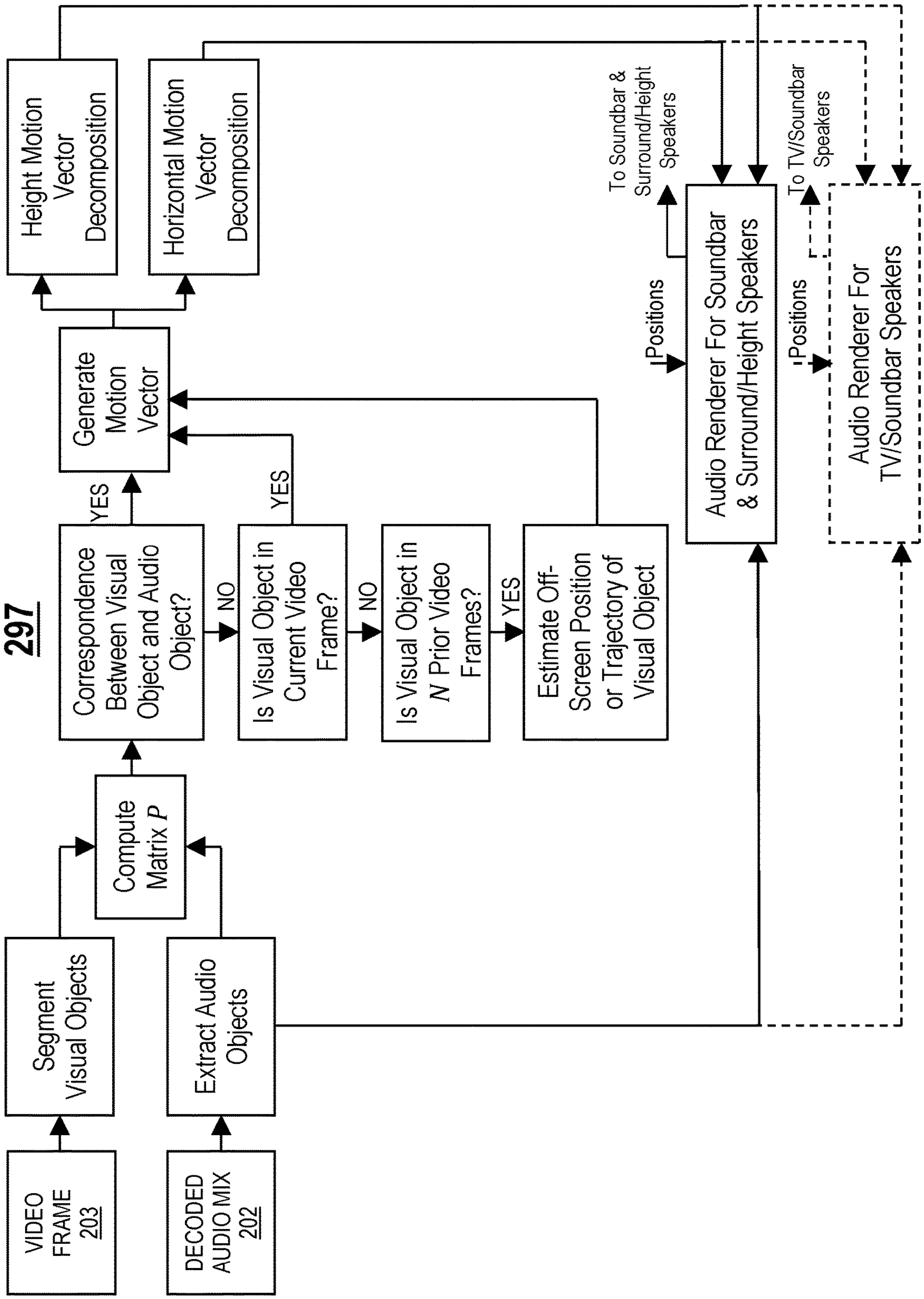
FIG. 3B illustrates another example workflow implemented by the on-device automatic audio upmixing system, in one or more embodiments.

FIG. 3B illustrates another example workflow 297 implemented by the on-device automatic audio upmixing system 200, in one or more embodiments. As part of the workflow 297, the system 200 jointly performs audio analysis (i.e., audio scene analysis) and video scene analysis on-device (i.e., on a client device, e.g., on an electronic device 110). Specifically, the system 200 segments (e.g., via the visual object segmentation unit 210) one or more visual objects from one or more video frames 203 of a video 201 (FIG. 2), and extracts (e.g., via the audio object extraction unit 220) one or more audio objects from a decoded audio mix 202 corresponding to the video 201.

The system 200 then computes (e.g., via the matrix computation unit 230) a matrix P of probabilities. For each object pair corresponding to each probability of the matrix P, the system 200 determines (e.g., via the correspondence determination unit 240) whether there is a match (i.e., correspondence) between a visual object of the object pair and an audio object of the same object pair in a current video frame.

If there is a match between the visual object and the audio object (i.e., both are in the current video frame), the system 200 generates (e.g., via the motion vector generation unit 250) a motion vector of the visual object, and decomposes (e.g., via the decomposition units 255A and 255B) the motion vector into a height motion vector of the visual object and a horizontal motion vector of the visual object.

If there is no match between the visual object and the audio object, the system 200 further determines (e.g., via the correspondence determination unit 240) whether the visual object is in the current video frame.

If the visual object is in the current video frame, the system 200 generates (e.g., via the motion vector generation unit 250) a motion vector of the visual object, and decomposes (e.g., via the decomposition units 255A and 255B) the motion vector into a height motion vector of the visual object and a horizontal motion vector of the visual object.

If the visual object is not in the current video frame, the system 200 further determines (e.g., via the correspondence determination unit 240) whether the visual object is in N prior video frames preceding the current video frame.

If the visual object is in the N prior video frames (indicating the visual object has moved on-screen to off-screen), the system 200 estimates (e.g., via the off-screen visual object estimation unit 260) an off-screen position or trajectory of the video object, and determines the trajectory or position of the corresponding audio object based on the estimated trajectory/position of the corresponding visual object.

The system 200 renders (e.g., via the first audio renderer 290) the audio object for soundbar and surround/height speakers based on positions of the soundbar and surround/height speakers, the height motion vector of the visual object, and the horizontal motion vector of the visual object. The resulting rendered audio object is matched to the video and delivered to the soundbar and surround/height for audio reproduction.

Optionally, the system 200 renders (e.g., via the second audio renderer 295) the audio object for TV/soundbar speakers based on positions of the TV/soundbar speakers, the height motion vector of the visual object, and the horizontal motion vector of the visual object. The resulting rendered audio object is matched to the video and delivered to the TV/soundbar speakers for audio reproduction.

The example workflow 297 in FIG. 3B is a simplified version of the example workflow 296 in FIG. 3A.

Figure 3C:
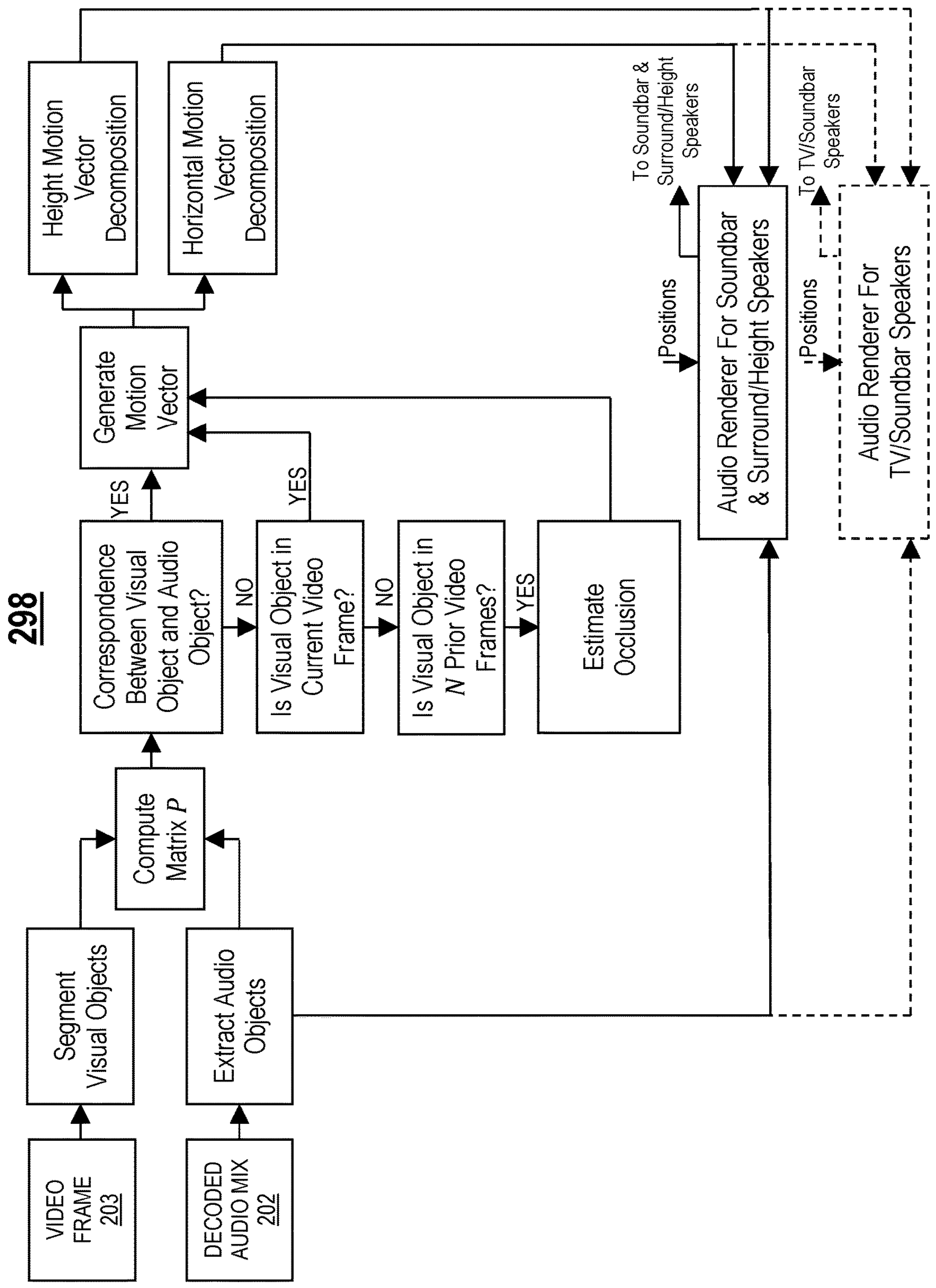
FIG. 3C illustrates yet another example workflow implemented by the on-device automatic audio upmixing system, in one or more embodiments.

FIG. 3C illustrates yet another example workflow 298 implemented by the on-device automatic audio upmixing system 200, in one or more embodiments. As part of the workflow 298, the system 200 jointly performs audio analysis (i.e., audio scene analysis) and video scene analysis on-device (i.e., on a client device, e.g., on an electronic device 110). Specifically, the system 200 segments (e.g., via the visual object segmentation unit 210) one or more visual objects from one or more video frames 203 of a video 201 (FIG. 2), and extracts (e.g., via the audio object extraction unit 220) one or more audio objects from a decoded audio mix 202 corresponding to the video 201.

The system 200 then computes (e.g., via the matrix computation unit 230) a matrix P of probabilities. For each object pair corresponding to each probability of the matrix P, the system 200 determines (e.g., via the correspondence determination unit 240) whether there is a match (i.e., correspondence) between a visual object of the object pair and an audio object of the same object pair in a current video frame.

If there is a match between the visual object and the audio object (i.e., both are in the current video frame), the system 200 generates (e.g., via the motion vector generation unit 250) a motion vector of the visual object, and decomposes (e.g., via the decomposition units 255A and 255B) the motion vector into a height motion vector of the visual object and a horizontal motion vector of the visual object.

If there is no match between the visual object and the audio object, the system 200 further determines (e.g., via the correspondence determination unit 240) whether the visual object is in the current video frame.

If the visual object is in the current video frame, the system 200 generates (e.g., via the motion vector generation unit 250) a motion vector of the visual object, and decomposes (e.g., via the decomposition units 255A and 255B) the motion vector into a height motion vector of the visual object and a horizontal motion vector of the visual object.

If the visual object is not in the current video frame, the system 200 further determines (e.g., via the correspondence determination unit 240) whether the visual object is in N prior video frames preceding the current video frame.

If the visual object is in the N prior video frames, the system 200 estimates (e.g., via the occlusion estimation unit 280) occlusion for the visual object (i.e., the visual object is partially or totally occluded), generates (e.g., via the motion vector generation unit 250) a motion vector of the visual object, and decomposes (e.g., via the decomposition units 255A and 255B) the motion vector into a height motion vector of the visual object and a horizontal motion vector of the visual object.

The system 200 renders (e.g., via the first audio renderer 290) the audio object for soundbar and surround/height speakers based on positions of the soundbar and surround/height speakers, the height motion vector of the visual object, and the horizontal motion vector of the visual object. The resulting rendered audio object is matched to the video and delivered to the soundbar and surround/height for audio reproduction.

Optionally, the system 200 renders (e.g., via the second audio renderer 295) the audio object for TV/soundbar speakers based on positions of the TV/soundbar speakers, the height motion vector of the visual object, and the horizontal motion vector of the visual object. The resulting rendered audio object is matched to the video and delivered to the TV/soundbar speakers for audio reproduction.

The example workflow 298 accounts for visual objects that are occluded in a current video frame (i.e., partially or totally blocked by other visual objects).

Figure 4:
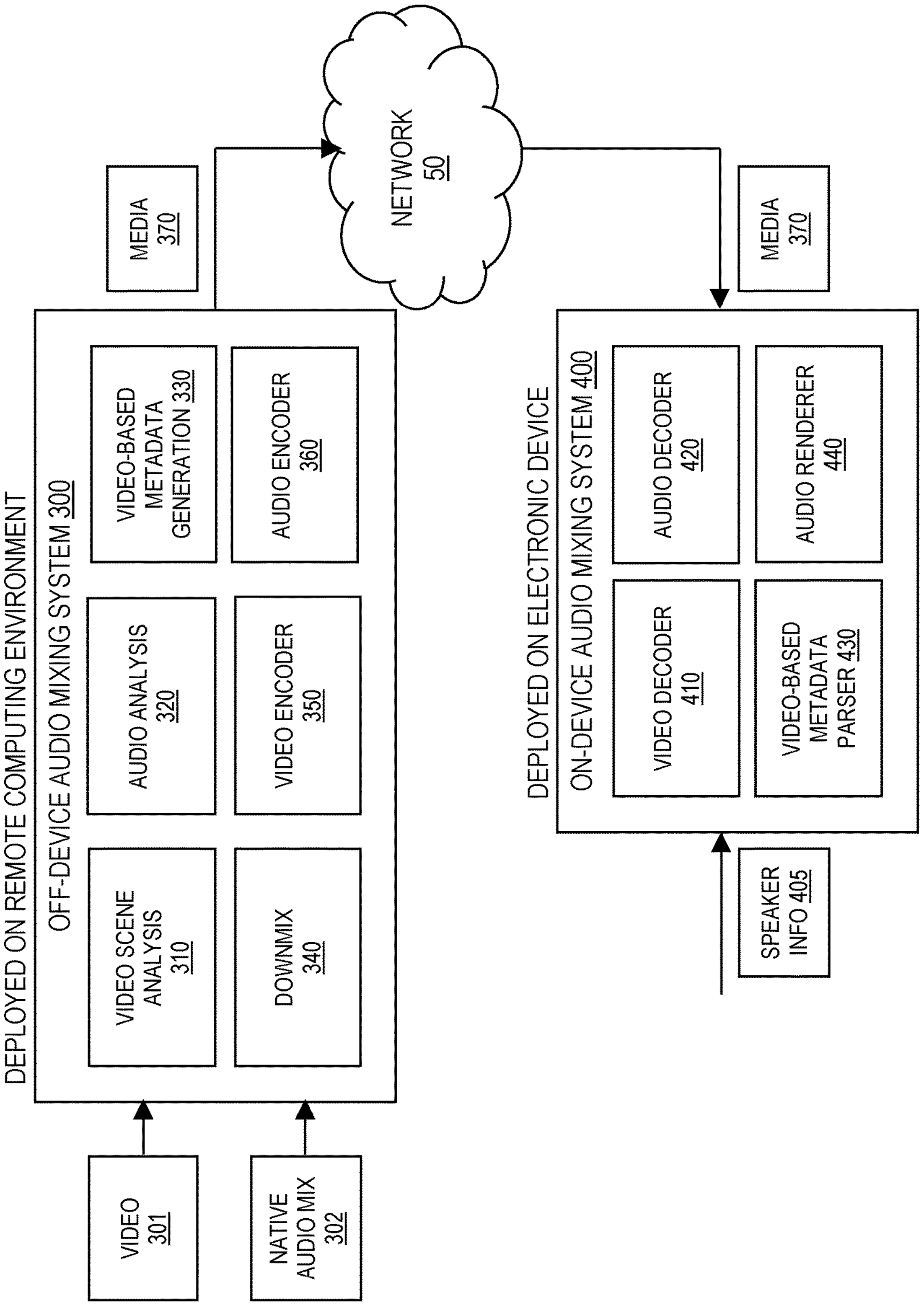
FIG. 4 illustrates an example off-device automatic audio mixing system and an example on-device automatic audio mixing system, in one or more embodiments.

FIG. 4 illustrates an example off-device automatic audio mixing system 300 and an example on-device automatic audio mixing system 400, in one or more embodiments. In one embodiment, an application 133 (FIG. 1) executing/running on a remote computing environment 130 is implemented as the system 300, and an application 116 (FIG. 1) executing/running on an electronic device 110 (FIG. 1) is implemented as the system 400. Together, the systems 300 and 400 implement end-to-end surround sound to immersive audio upmixing based on video scene analysis in an encoder-decoder based manner (downmixing and encoding performed remotely; decoding and upmixing performed on-device).

In one embodiment, the system 300 is configured to receive at least the following inputs: (1) a video 301 comprising a plurality of video frames, and (2) a native audio mix 302 (e.g., a native audio mix in 5.1 surround sound format, 7.1 surround sound format, or 7.1.4 immersive audio format) corresponding to the video 301.

In one embodiment, the system 300 comprises a video scene analysis unit 310 configured to perform video scene analysis over multiple video frames of the video 301. In one embodiment, the video scene analysis involves segmenting one or more scenes and/or one or more visual objects from one or more video frames of the video 301.

Let $v_i$ generally denote a visual object segmented from the video 301, wherein $i \in [1,N]$. For each visual object $v_i$, the video scene analysis further involves at least the following: (1) classifying the visual object $v_i$ with a corresponding classification, (2) generating a corresponding bounding box, and (3) determining coordinates $v_i(p^f,q^f)$ of the corresponding bounding box.

In one embodiment, the system 300 comprises an audio analysis unit 320 configured to perform audio analysis (i.e., audio scene analysis) of the native audio mix 302. In one embodiment, the audio analysis involves extracting, using one or more audio source separation techniques, one or more audio objects (i.e., audio signals) from the native audio mix 302. Let $a_j$ generally denote an audio object extracted from the native audio mix 302, wherein $j \in [1,M]$. For each audio object $a_j$, the audio analysis further involves classifying the audio object $a_j$ with a corresponding classification.

In one embodiment, the system 300 comprises a video-based metadata generation unit 330 configured to generate video-based metadata based on the audio analysis and the video scene analysis (e.g., performed via the video scene analysis unit 310 and the audio analysis unit 320). Specifically, the video-based metadata comprises, for each visual object $v_i$, a corresponding size of the visual object $v_i$ (based on differences between coordinates of a corresponding bounding box along each axis), a corresponding position of the visual object, and a corresponding velocity of the visual object. For each object pair comprising a visual object $v_i$ and an audio object $v_i$ that have a scene correlation, the video-based metadata further comprises a corresponding classification of the visual object $v_i$ and a corresponding classification of the audio object $a_i$.

In one embodiment, the system 300 comprises a downmix unit 340 configured to generate a downmix of the native audio mix 302.

In one embodiment, the system 300 comprises a video encoder unit 350 configured to encode the video 301, resulting in encoded video.

In one embodiment, the system 300 comprises an audio encoder unit 360 configured to encode a downmix of the native audio mix 302 (e.g., from the downmix unit 340), and insert video-based metadata (e.g., from the video-based metadata generation unit 330), resulting in encoded audio with the video-based metadata inserted. The encoded video and the encoded audio with the video-based metadata inserted are transmitted, via a network 50, as media 370 for streaming, broadcasting, or storage on a server.

In one embodiment, the system 400 is configured to receive at least the following inputs: (1) via the network 50, media 370 from streaming, broadcasting, or retrieved from storage on a server, and (2) speaker information 405 relating to speakers (e.g., speakers 140 in FIG. 1) available for audio reproduction. The speaker information 405 includes information such as, but not limited to, loudspeaker setup (i.e., speaker configuration) of the speakers, type of the speakers (e.g., headphones, TV speakers, surround speakers, height speakers, soundbar, etc.), positions of the speakers, model of the speakers, etc.

In one embodiment, the system 400 comprises a video decoder 410 configured to decode encoded video included in the media 370, resulting in decoded video for presentation on a display device (e.g., display device 60 in FIG. 1).

In one embodiment, the system 400 comprises an audio decoder 420 configured to decode encoded audio included in the media 370, resulting in decoded audio.

In one embodiment, the system 400 comprises a video-based metadata parser 430 configured to parse video-based metadata inserted in the encoded audio.

In one embodiment, the system 400 comprises an audio renderer 440 configured to render audio based on the decoded audio, the speaker information 405, and the video-based metadata, wherein the rendered audio is delivered to speakers for audio reproduction. The audio renderer 440 can upmix the decoded audio based on the video-based metadata.

In one embodiment, the audio renderer 440 is configured to perform various automated mixing operations such as, but not limited to, the following: (1) unmixer (source-separation) for audio objects with classifications based on visual objects with classifications, (2) panner (e.g., VBAP panner), (3) decorrelator (spread for size of audio object), (4) snapper (snap to loudspeaker), (5) room equalization, and (6) de-reverberation.

One or more embodiments of the system 400 may be integrated into, or implemented as part of, a loudspeaker control system or a loudspeaker management system. One or more embodiments of the system 400 may be implemented in soundbars with satellite speakers (surround/height speakers). One or more embodiments of the system 400 may be implemented in TVs for use in combination with soundbars and surround/height speakers.

Figure 5:
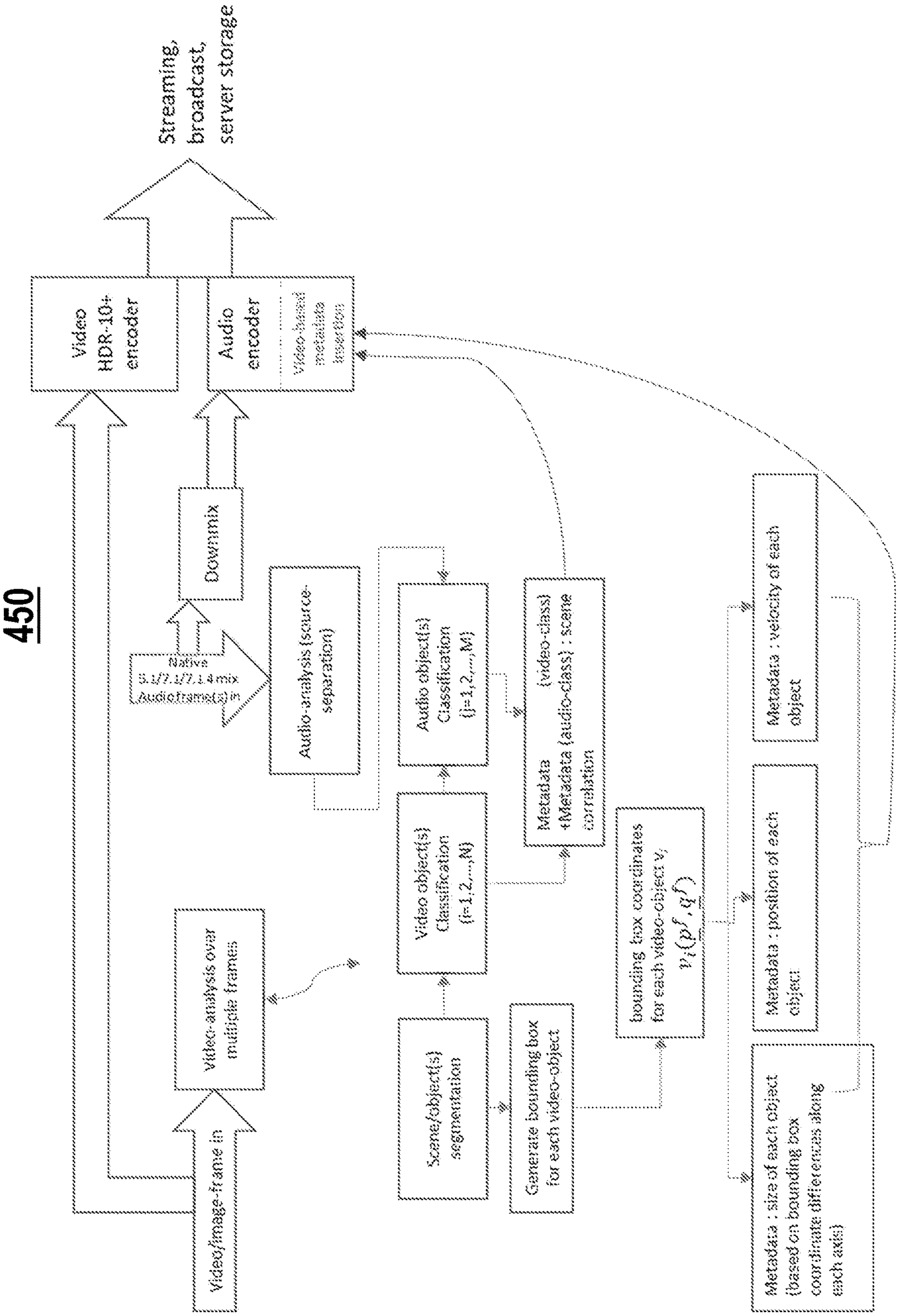
FIG. 5 illustrates an example workflow implemented by the off-device automatic audio mixing system, in one or more embodiments.

FIG. 5 illustrates an example workflow 450 implemented by the off-device automatic audio mixing system 300, in one or more embodiments. As part of the workflow 450, the system 300 jointly performs audio analysis (e.g., via the audio analysis unit 320) and video scene analysis (e.g., via the video scene analysis unit 310) off-device (i.e., remotely, e.g., on a remote computing environment 130). The video scene analysis involves segmenting scenes and/or visual objects from video frames of a video, classifying each visual object $v_i$, generating a bounding box for each visual object $v_i$, and determining coordinates $v_i(p^f,q^f)$ of a bounding box for each visual object $v_i$.

The audio analysis involves extracting, using one or more audio source separation techniques, one or more audio objects (i.e., audio signals) from a native audio mix corresponding to the video, and classifying each audio object $a_j$.

The system 300 generates (e.g., via the video-based metadata generation unit 330) video-based metadata based on the audio analysis and the video scene analysis. The video-based metadata comprises a size of each visual object $v_i$ (based on differences between coordinates of a corresponding bounding box along each axis), a position of each visual object $v_i$, a velocity of each visual object $v_i$, and classifications of each visual object $v_i$ and each audio object $a_i$ pairing that have a scene correlation.

The system 300 downmixes (e.g., via the downmix unit 340) the native audio mix, encodes the video (e.g., via the video encoder unit 350), encodes a downmix of the native audio mix (e.g., via the audio encoder unit 360), inserts the video-based metadata into the resulting encoded audio (e.g., via the audio encoder unit 360), and transmits the resulting encoded video and the encoded audio with the video-based metadata inserted for streaming, broadcasting, or storage on a server.

Figure 6:
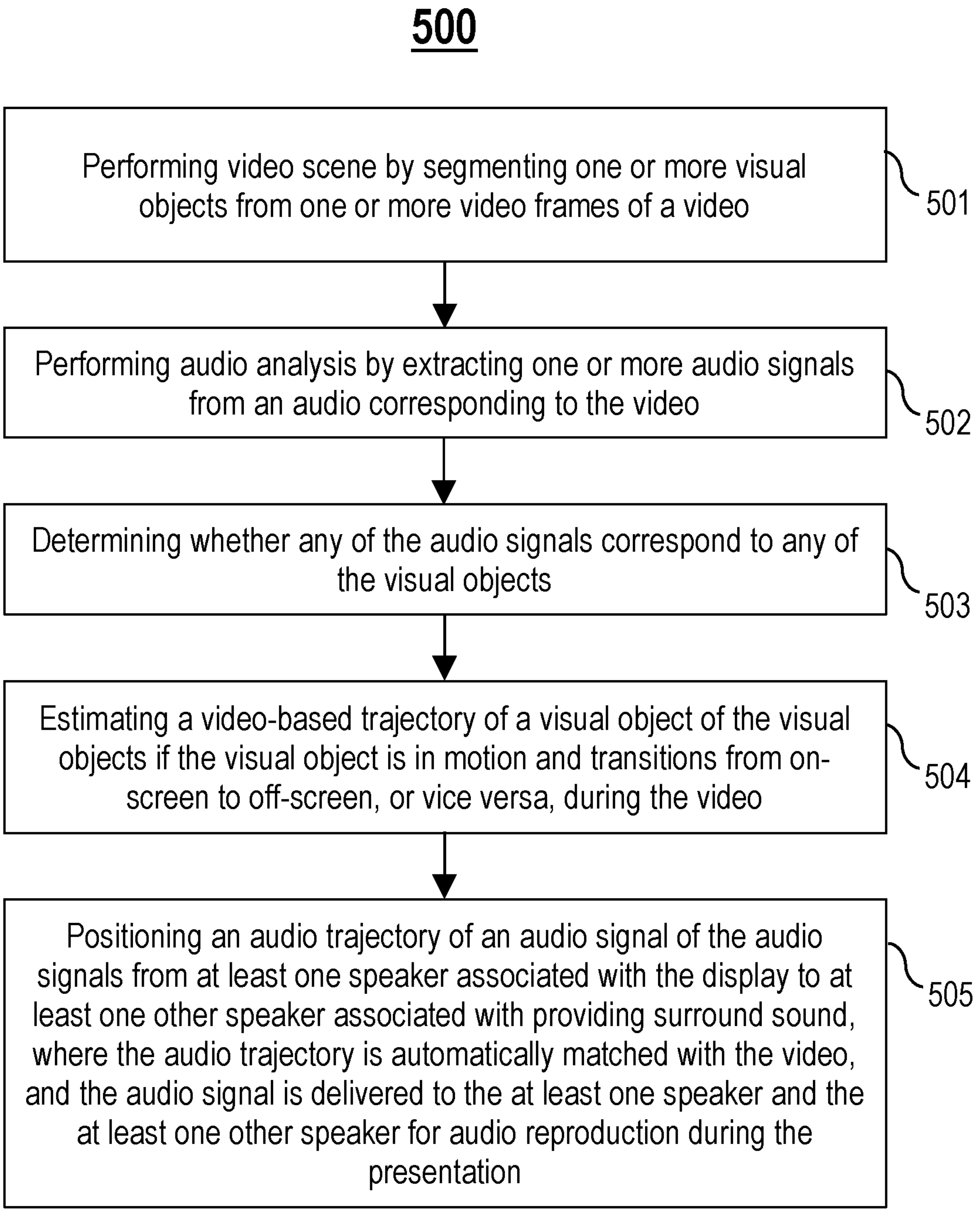
FIG. 6 is a flowchart of an example process for audio upmixing, in one or more embodiments.

FIG. 6 is a flowchart of an example process 500 for audio upmixing, in one or more embodiments. Process block 501 includes performing video scene analysis by segmenting one or more visual objects from one or more video frames of a video. Process block 502 includes performing audio analysis (i.e., audio scene analysis) by extracting one or more audio signals from an audio corresponding to the video. Process block 503 includes determining whether any of the audio signals correspond to any of the visual objects. Process block 504 includes estimating a video-based trajectory of a visual object of the visual objects if the visual object is in motion and transitions from on-screen to off-screen, or vice versa, during the video. Process block 505 includes positioning an audio trajectory of an audio signal of the audio signals from at least one speaker associated with the display to at least one other speaker associated with providing surround sound, where the audio trajectory is automatically matched with the video, and the audio signal is delivered to the at least one speaker and the at least one other speaker for audio reproduction during the presentation.

In one embodiment, process blocks 501-505 may be performed by one or more components of the system 200, the system 300, and/or the system 400.

Figure 7:
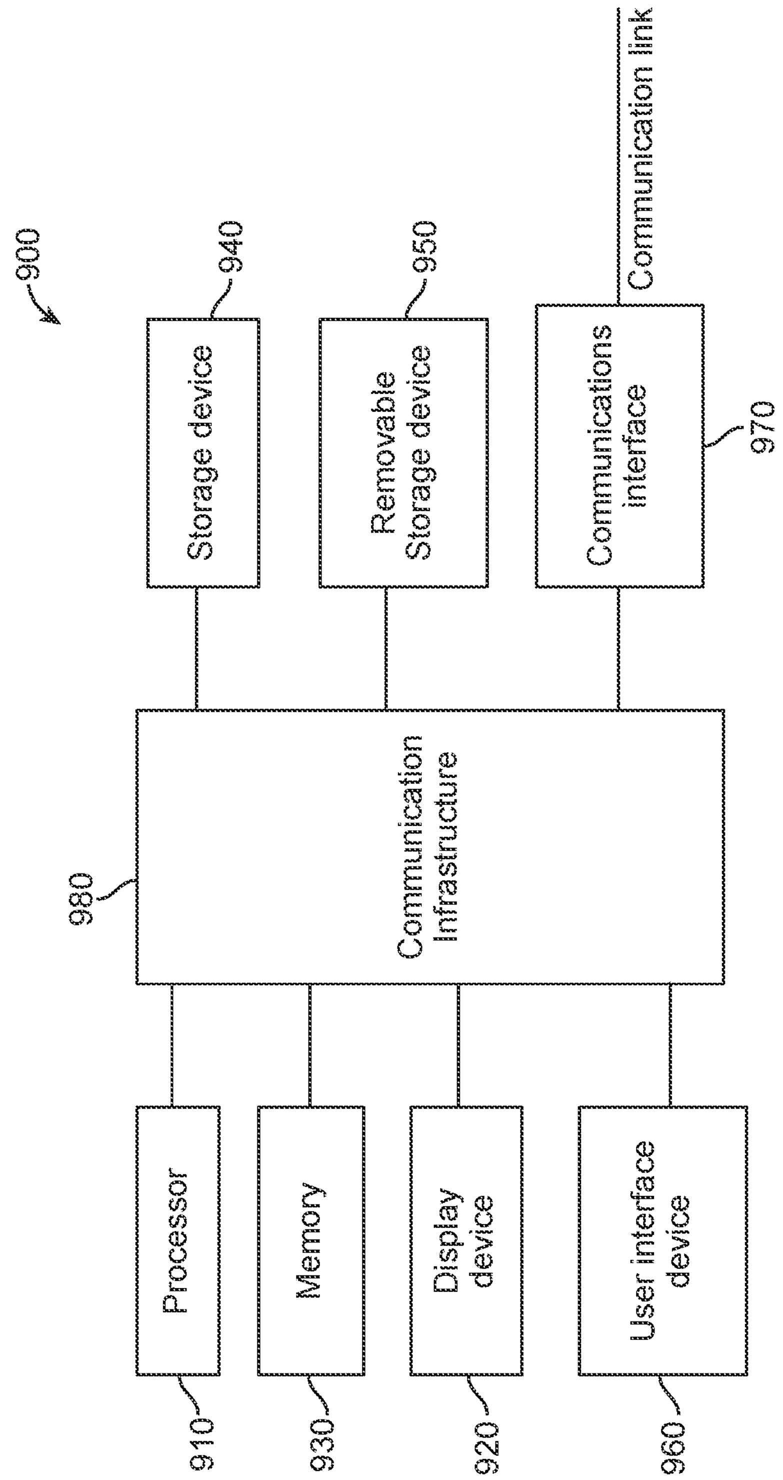
FIG. 7 is a high-level block diagram showing an information processing system comprising a computer system useful for implementing the disclosed embodiments.

FIG. 7 is a high-level block diagram showing an information processing system comprising a computer system 900 useful for implementing the disclosed embodiments. The systems 200, 300, and 400 may be incorporated in the computer system 900. The computer system 900 includes one or more processors 910, and can further include an electronic display device 920 (for displaying video, graphics, text, and other data), a main memory 930 (e.g., random access memory (RAM)), storage device 940 (e.g., hard disk drive), removable storage device 950 (e.g., removable storage drive, removable memory module, a magnetic tape drive, optical disk drive, computer readable medium having stored therein computer software and/or data), viewer interface device 960 (e.g., keyboard, touch screen, keypad, pointing device), and a communication interface 970 (e.g., modem, a network interface (such as an Ethernet card), a communications port, or a PCMCIA slot and card). The communication interface 970 allows software and data to be transferred between the computer system and external devices. The system 900 further includes a communications infrastructure 980 (e.g., a communications bus, cross-over bar, or network) to which the aforementioned devices/modules 910 through 970 are connected.

Information transferred via communications interface 970 may be in the form of signals such as electronic, electromagnetic, optical, or other signals capable of being received by communications interface 970, via a communication link that carries signals and may be implemented using wire or cable, fiber optics, a phone line, a cellular phone link, a radio frequency (RF) link, and/or other communication channels. Computer program instructions representing the block diagram and/or flowcharts herein may be loaded onto a computer, programmable data processing apparatus, or processing devices to cause a series of operations performed thereon to generate a computer implemented process. In one embodiment, processing instructions for process 500 (FIG. 6) may be stored as program instructions on the memory

930, storage device 940, and/or the removable storage device 950 for execution by the processor 910.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the disclosed technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the disclosed technology.

Though the embodiments have been described with reference to certain versions thereof; however, other versions are possible. Therefore, the spirit and scope of the appended claims should not be limited to the description of the preferred versions contained herein.

What is claimed is:

1. A method of audio upmixing, comprising:

performing video scene analysis by segmenting one or more visual objects from one or more video frames of a video;

performing audio analysis by extracting one or more audio signals from an audio corresponding to the video;

determining whether any of the audio signals correspond to any of the visual objects;

estimating a video-based trajectory of a visual object of the visual objects if the visual object is in motion and transitions from on-screen to off-screen, or vice versa, during the video; and positioning an audio trajectory of an audio signal of the audio signals from at least one speaker associated with the display to at least one other speaker associated with providing surround sound, wherein the audio trajectory is automatically matched with the video, and the audio signal is delivered to the at least one speaker and the at least one other speaker for audio reproduction during presentation of the video.

2. The method of claim 1, wherein each of the audio signals corresponds to either one of the visual objects or a non-visual object that is not visually present in the one or more video frames.

3. The method of claim 1, wherein the positioning includes panning the audio trajectory of the audio signal between the at least one speaker and the at least one other speaker.

4. The method of claim 1, wherein the visual trajectory correlates with the panning during the transitions if the audio signal corresponds to the visual object.

5. The method of claim 1, wherein the extracting comprises:

for each of the audio signals:

classifying the audio signal as directional or diffuse; and estimating a likelihood that the audio signal is assigned to a horizontal speaker channel or a height speaker channel based on the classifying.

6. The method of claim 1, wherein the audio signals are extracted from the audio using one or more audio separation techniques.

7. The method of claim 1, wherein the at least one other speaker comprises at least one of a surround sound speaker or a height speaker.

8. A system of audio upmixing, comprising:

at least one processor; and a non-transitory processor-readable memory device storing instructions that when executed by the at least one processor causes the at least one processor to perform operations including:

performing video scene analysis by segmenting one or more visual objects from one or more video frames of a video;

performing audio analysis by extracting one or more audio signals from an audio corresponding to the video;

determining whether any of the audio signals correspond to any of the visual objects;

estimating a video-based trajectory of a visual object of the visual objects if the visual object is in motion and transitions from on-screen to off-screen, or vice versa, during the video; and positioning an audio trajectory of an audio signal of the audio signals from at least one speaker associated with the display to at least one other speaker associated with providing surround sound, wherein the audio trajectory is automatically matched with the video, and the audio signal is delivered to the at least one speaker and the at least one other speaker for audio reproduction during presentation of the video.

9. The system of claim 8, wherein each of the audio signals corresponds to either one of the visual objects or a non-visual object that is not visually present in the one or more video frames.

10. The system of claim 8, wherein the positioning includes panning the audio trajectory of the audio signal between the at least one speaker and the at least one other speaker.

11. The system of claim 8, wherein the visual trajectory correlates with the panning during the transitions if the audio signal corresponds to the visual object.

12. The system of claim 8, wherein the extracting comprises:

for each of the audio signals:

classifying the audio signal as directional or diffuse; and estimating a likelihood that the audio signal is assigned to a horizontal speaker channel or a height speaker channel based on the classifying.

13. The system of claim 8, wherein the audio signals are extracted from the audio using one or more audio separation techniques.

14. The system of claim 8, wherein the at least one other speaker comprises at least one of a surround sound speaker or a height speaker.

15. A non-transitory processor-readable medium that includes a program that when executed by a processor performs a method of audio upmixing, the method comprising:

performing video scene analysis by segmenting one or more visual objects from one or more video frames of a video;

performing audio analysis by extracting one or more audio signals from an audio corresponding to the video;

determining whether any of the audio signals correspond to any of the visual objects;

estimating a video-based trajectory of a visual object of the visual objects if the visual object is in motion and transitions from on-screen to off-screen, or vice versa, during the video; and positioning an audio trajectory of an audio signal of the audio signals from at least one speaker associated with the display to at least one other speaker associated with providing surround sound, wherein the audio trajectory is automatically matched with the video, and the audio signal is delivered to the at least one speaker and the at least one other speaker for audio reproduction during presentation of the video.

16. The non-transitory processor-readable medium of claim 15, wherein each of the audio signals corresponds to either one of the visual objects or a non-visual object that is not visually present in the one or more video frames.

17. The non-transitory processor-readable medium of claim 15, wherein the positioning includes panning the audio trajectory of the audio signal between the at least one speaker and the at least one other speaker.

18. The non-transitory processor-readable medium of claim 15, wherein the visual trajectory correlates with the panning during the transitions if the audio signal corresponds to the visual object.

19. The non-transitory processor-readable medium of claim 15, wherein the extracting comprises:

for each of the audio signals:

classifying the audio signal as directional or diffuse; and estimating a likelihood that the audio signal is assigned to a horizontal speaker channel or a height speaker channel based on the classifying.

20. The non-transitory processor-readable medium of claim 15, wherein the at least one other speaker comprises at least one of a surround sound speaker or a height speaker.

* * * * *